United States Patent [19]

Walker

[11] Patent Number: 4,834,486
[45] Date of Patent: May 30, 1989

[54] CONNECTOR SLEEVE ADAPTER

[75] Inventor: Scott A. Walker, Winston-Salem, N.C.

[73] Assignee: Siecor Corporation, Hickory, N.C.

[21] Appl. No.: 184,443

[22] Filed: Apr. 21, 1988

[51] Int. Cl.⁴ ............................................. G02B 6/36
[52] U.S. Cl. ............................ 350/96.20; 350/96.21
[58] Field of Search ........................... 350/96.20, 96.21

[56] References Cited

U.S. PATENT DOCUMENTS 4,217,030  8/1980  Howarth ........................... 350/96.21
4,432,604  2/1984  Schwab ............................ 350/96.21
4,752,110  6/1988  Blanchet et al. .................. 350/96.20
4,754,876  7/1988  Noon et al. ....................... 350/96.20
4,762,387  8/1988  Batdorf et al. ................... 350/96.20

Primary Examiner—William L. Sikes
Assistant Examiner—Akm E. Ullah
Attorney, Agent, or Firm—J. David Abernethy

[57] ABSTRACT

Disclosed herein is an adapter for mounting fiber optic connector sleeves having differing external shapes to a panel having an array of like shaped panel holes. A connector sleeve holder has multiple sidewalls having different shapes, in order to hold differing connector sleeves to a panel.

6 Claims, 4 Drawing Sheets

CONNECTOR SLEEVE ADAPTER

BACKGROUND OF THE INVENTION

1. Field of the Invention

The field of the invention is fiber optic connector sleeves and apparatus for employing them.

2. Background of the Invention

The term "fiber optic connector sleeve" as used herein means a device for holding fiber optic connectors in coaxial relationship, in order that optical fibers entering each fiber optic connector in the connector sleeve may be held in the appropriate relationship with each other. The industry calls such fiber optic connectors by different names according to their function, such as "attenuators" for decreasing the power transmitted from one optical fiber to another, or other terms, such as "bulkhead assembly" or simply "connector."

Industries which have been in existence for long periods of time tend to become standardized. Such is the case in most aspects of the field of devices for carrying electric current from one place to another, such as plugs, jacks, switchboxes, or the like. In contrast, the field of applied fiber optics is relatively young, with many different manufacturers competing with each other. As a result, the field is not standardized at the current time. Therefore, various companies make differing fiber optic connector sleeves which have differing external shapes. This situation impacts upon those making connector panels for such fiber optic connector sleeves. If a manufacturer is making a panel, some panels in the unit may have to have holes of one shape, while other panels have holes of another shape, in order to accommodate differing customer requirements. The manufacturer may also wish to have differing product lines, with each product line adapted to use a specific type connector. In any event, the resulting manufacturing process is made more expensive, and the ability of the customer to adapt to changing conditions is less than would be the case if standardization of the various external shapes were complete.

A means using a panel having a uniform set of panel holes to accommodate various fiber optic connector sleeves having different external shapes would, therefore, tend to reduce manufacturing costs for the supplier, thereby reducing the price of such units to the customer, and would also allow the customer to adapt to future needs in the fiber optic networks of the future. The adapter disclosed herein allows the customer to use a panel having a set of uniformly shaped holes to be used with fiber optic connector sleeves having differing external shapes, so that these advantages maybe realized in the industry.

SUMMARY OF THE INVENTION

The present invention is an adapter for mounting fiber optic connector sleeves having differing external shapes into a panel having an array of like shaped panel holes. A connector sleeve holder has opposing first and second sides and a channel extending between the first and second sides. The channel walls include a first floor parallel to the first side and located between the first side and the second side, a second floor parallel to the second side and located between the second side and the first floor, a first sidewall adapted to snugly receive a first optic connector sleeve having a first external shape located between the first side and the first floor, and a second sidewall adapted to receive a second fiber optic connector sleeve having a second external shape located between the second side and the second floor. In the preferred embodiment, a third sidewall is adapted to snugly receive a third fiber optic connector sleeve having a third external shape located between the first side and the first floor, and a fourth sidewall adapted to snugly receive a fourth fiber optic connector sleeve having a fourth external shape is located between the second side and the second floor.

In addition to the connector sleeve holder, there must be means for mounting the connector sleeve holder to the panel, so that a fiber optic connector sleeve may be held in communication with a panel hole. Mounting could be accomplished by adhesive, common fasteners such as screws, or the like. The preferred embodiment includes a fastener placed on the opposite side of the panel from the connector sleeve holder having two clasps extending through a panel hole to engage the connector sleeve holder. The fiber optic connector sleeve then may be held between the sleeve holder and the panel. The two clasps may then be fastened to shoulders on the connector sleeve holder.

A further advantage of the adapter is that undesired rotation of the connector sleeve is prevented.

BRIEF DESCRIPTION OF THE DRAWINGS

Reference may now be had to the drawings, in which.

DETAILED DESCRIPTION OF THE PREFERRED EMBODIMENT

Figure 1:
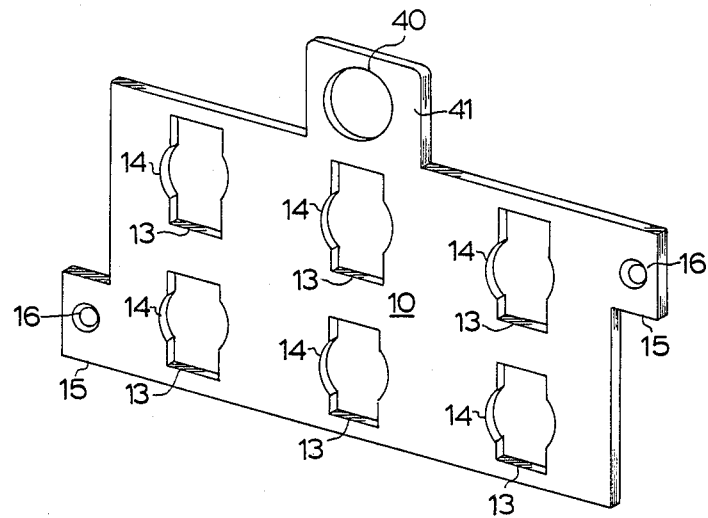
FIG. 1 is a perspective view of a panel.

FIG. 1 shows a panel for use in a frame for holding fiber optic connectors. A series of such panels would likely be used in the frame. Tabs 15 have holes 16 for use in attaching the panel to the frame. Tab 41 has hole 40 for padlocking purposes. Also shown is a 2×3 array of like shaped panel holes 14. Flattened areas 13 are shaped to allow the fastener clasps, to be discussed herein below, to pass through the holes. The central portion of the panel holes is rounded to allow the barrel portions of fiber optic connector sleeves to pass through the holes.

Figure 2:
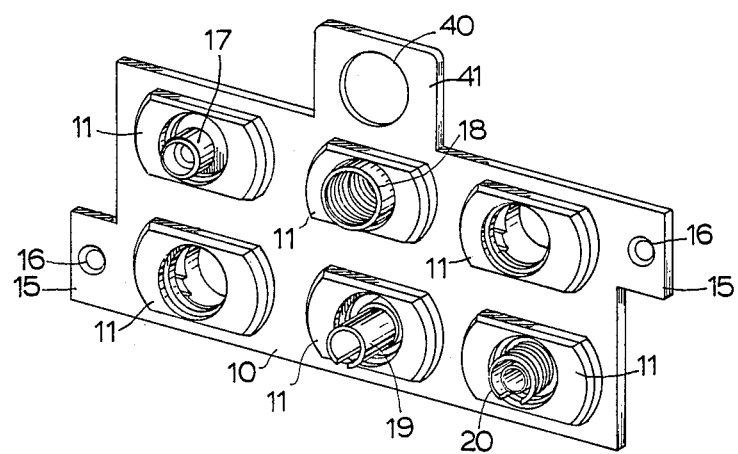
FIG. 2 is a perspective view of the panel having adapters according to the present invention mounted thereon, with four fiber optic connector sleeves shown within adapters.

FIG. 2 shows the panel of FIG. 1 with adapters according to the current invention fastened thereon. Fasteners 11 are visible in FIG. 2. First fiber optic connector sleeve 20, second fiber optic connector sleeve 19, third fiber optic connector sleeve 18, and fourth fiber optic connector sleeve 17, all having differing external shapes from each other, are shown placed in adapters.

Figure 3:
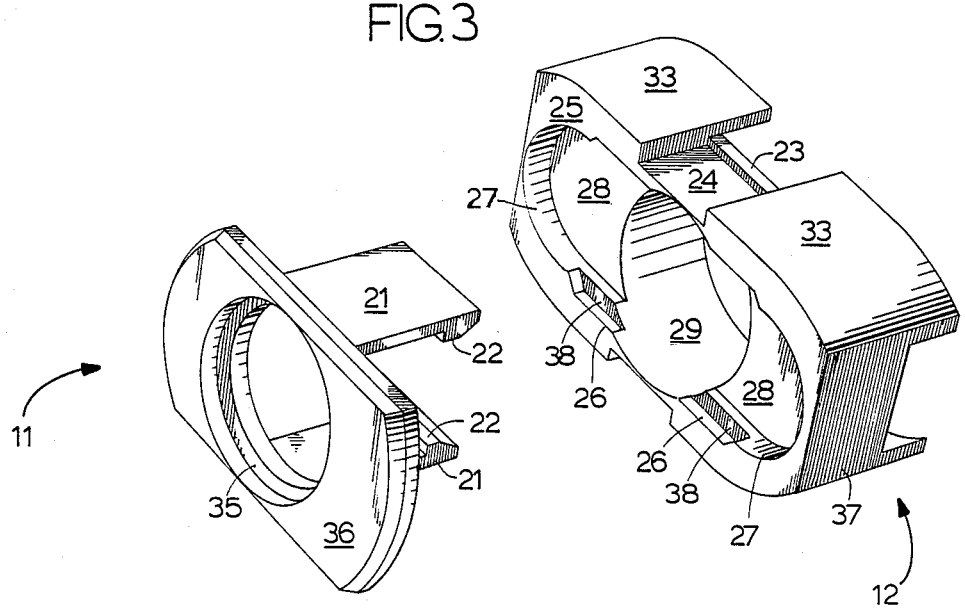
FIG. 3 is an enlarged view of the fastener and the second side of the connector sleeve holder.
Figure 4:
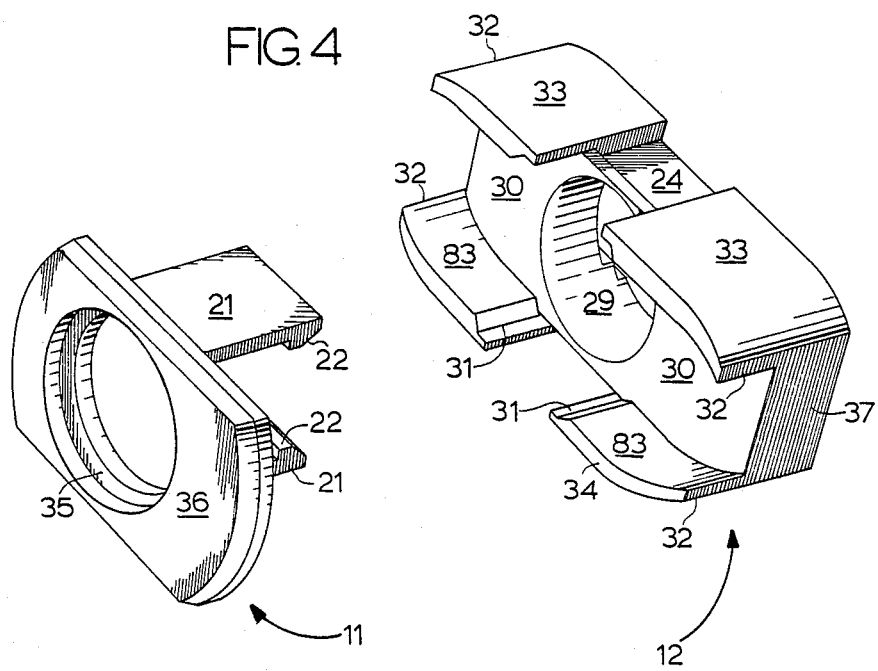
FIG. 4 is the same as FIG. 3, except the first side of the connector sleeve holder is shown.
Figure 5:
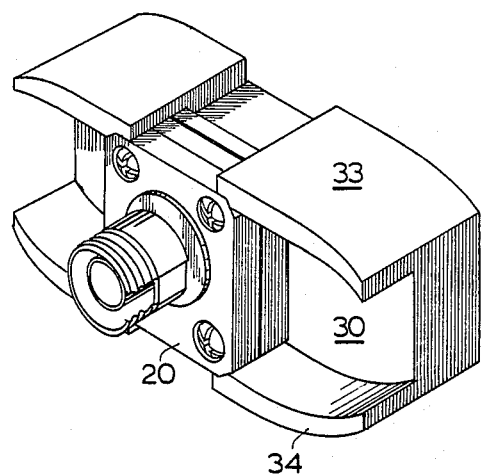
FIG. 5 is an enlarged perspective view of a first fiber optic connector sleeve received at the first side of the connector sleeve holder.

FIG. 3 and FIG. 4 show connector sleeve holder 12 and fastener 11. In use, fastener 11 would be on one side of the panel shown in FIG. 1, and connector sleeve holder 12 would be on the other side. After a fiber optic connector sleeve is placed in connector sleeve holder 12, clasps 21 would be placed through flattened areas 13 of a hole 14 and fastened to connector sleeve holder 12 around shoulders 23 protruding from inset surfaces 24. Claws 22 would engage shoulders 23, so that a fiber optic connector sleeve would be tightly held between the panel and connector sleeve holder 12. Surface 36 of fastener 11 is so shaped that in use it does not pass through one of the panel holes 14. Channel 35 appears in fastener 11 so that a connector sleeve can protrude through fastener 11.

FIG. 3 shows second side 25 of connector sleeve holder 12. Second floors 28 and fourth floors 38 are parallel to second side 25. Second sidewall 27 is adapted to snugly receive second fiber optic connector sleeve 19. Fourth sidewall 26 is adapted to snugly receive fourth fiber optic connector sleeve 17.

Figure 6:
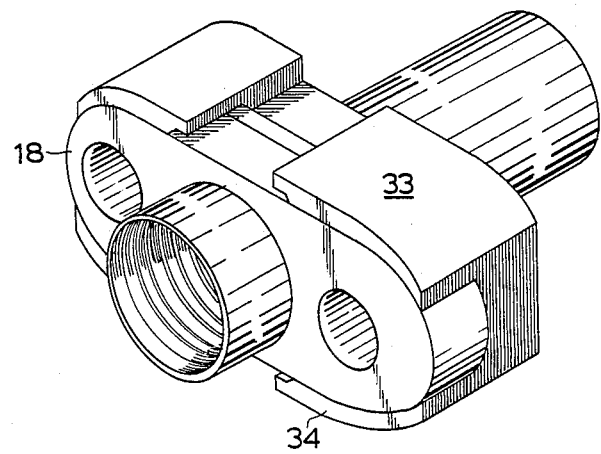
FIG. 6 is an enlarged perspective view of a third fiber optic connector sleeve received at the first side of the connector sleeve holder.
Figure 7:
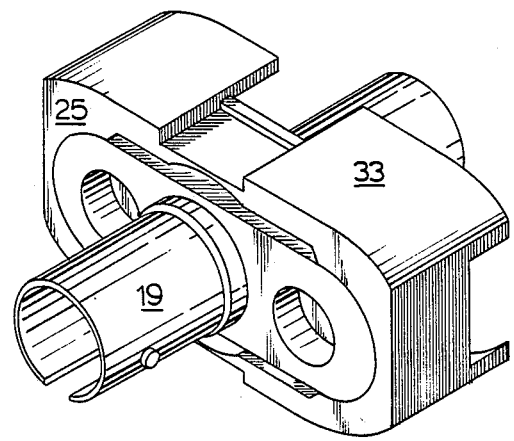
FIG. 7 is an enlarged perspective view of a second fiber optic connector sleeve received at the second side of the connector sleeve holder.
Figure 8:
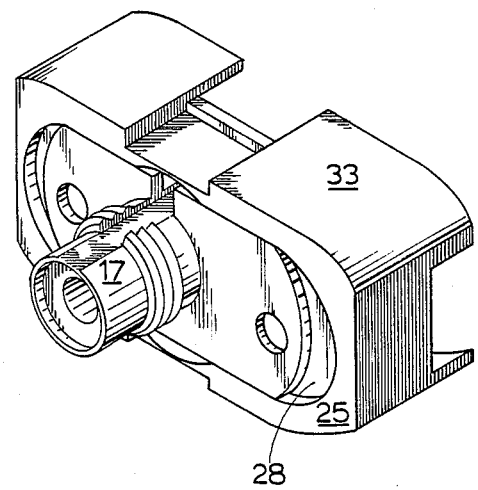
FIG. 8 is an enlarged perspective view of a fourth fiber optic connector sleeve received at the second side of the connector sleeve holder.

FIG. 4 shows first side 34 of connector sleeve holder 12. First floor 30 is parallel to first side 34. First sidewall 31 is adapted to snugly receive first fiber optic connector sleeve 20. Third sidewall 83 is adapted to snugly receive third fiber optic connector sleeve 18. Note third sidewalls 83 are terminated at edges 32 and third fiber optic connector sleeve 18 protrudes outward therefrom (see FIG. 6). In FIGS. 3 and 4, central sidewall 29, as well as sidewalls 31, 27, 83, and 26, delimit a channel extending between the first side 34 and second side 25 of connector sleeve holder 12.

In order to more fully illustrate the invention, FIGS. 5, 6, 7, and 8 show first fiber optic connector sleeve 20, third fiber optic connector sleeve 18, second fiber optic connector sleeve 19, and fourth fiber optic connector sleeve 17 inserted into connector sleeve holder 12 as shown.

In the figures shown, first connector sleeve 20 is a GTE Type FC Singlemode Fixed Attenuator; second connector sleeve 19 is an AT&T ST connector; third connector sleeve 18 is a Dorran Biconic Bulkhead Assembly; and fourth connector sleeve 17 is a GTE Type D4 Singlemode Fixed Attenuator.

In the preferred embodiment, fastener 11 and connector sleeve holder 12 are plastic parts made by injection molding. Clasps 21 are stiff but may be bent away from each other somewhat to allow insertion and removal from shoulders 23 of connector sleeve holder 12. Internal forces then restore clips 21 toward each other into their customary position.

Differing hole array and panel shapes can be used. While the disclosed adapter permits an array of like shaped panel holes to be employed, the adapter can be used in panels having holes of different shapes as well.

What is claimed is:

1. An adapter for mounting fiber optic connector sleeves having differing external shapes to a panel having an array of holes, comprising:
   (a) a connector sleeve holder having opposing first and second sides and an channel extending between the first and second sides, the channel delimited by walls comprising:
      (i) a first floor parallel to the first side and located between the first side and the second side;
      (ii) a second floor parallel to the second side and located between the second side and the first floor;
      (iii) a first sidewall adapted to snugly receive a first fiber optic connector sleeve having a first external shape located between the first side and the first floor; and,
      (iv) a second sidewall adapted to receive a second fiber optic connector sleeve having a second external shape located between the second side and the second floor; and
   (b) means for mounting the connector sleeve holder to the panel, so that a fiber optic connector sleeve may be held in communication with a panel hole.

2. An adapter for mounting fiber optic connector sleeves having differing external shapes to a panel having an array of holes as recited in claim 1, the channel delimited by walls further comprising a third sidewall adapted to snugly receive a third fiber optic connector sleeve having a third external shape located between the first side and the first floor.

3. An adapter for mounting fiber optic connector sleeves having differing external shapes to a panel having an array of holes as recited in claim 2, the channel delimited by walls further comprising a fourth sidewall adapted to snugly receive a fourth fiber optic connector sleeve having a fourth external shape located between the second side and the second floor.

4. An adapter for mounting fiber optic connector sleeves having differing external shapes to a panel having an array of holes as recited in claim 1, wherein the means for mounting the connector sleeve holder to the panel comprises a fastener comprising a clasp which is so dimensioned as to be insertable through a panel hole.

5. An adapter for mounting fiber optic connector sleeves having differing external shapes to a panel having an array of holes as recited in claim 4, the channel delimited by walls further comprising:
   (a) a third sidewall adapted to snugly receive a third fiber optic connector sleeve having a third external shape located between the first side and the first floor; and,
   (b) a fourth sidewall adapted to receive a fourth fiber optic connector sleeve having a fourth external shape located between the second side and the second floor.

6. An adapter for mounting fiber optic connector sleeves having differing external shapes to a panel having an array of holes as recited in claim 5, the connector sleeve holder having at least one shoulder thereon for receiving the clasp.

* * * * *